UNITED STATES PATENT OFFICE.

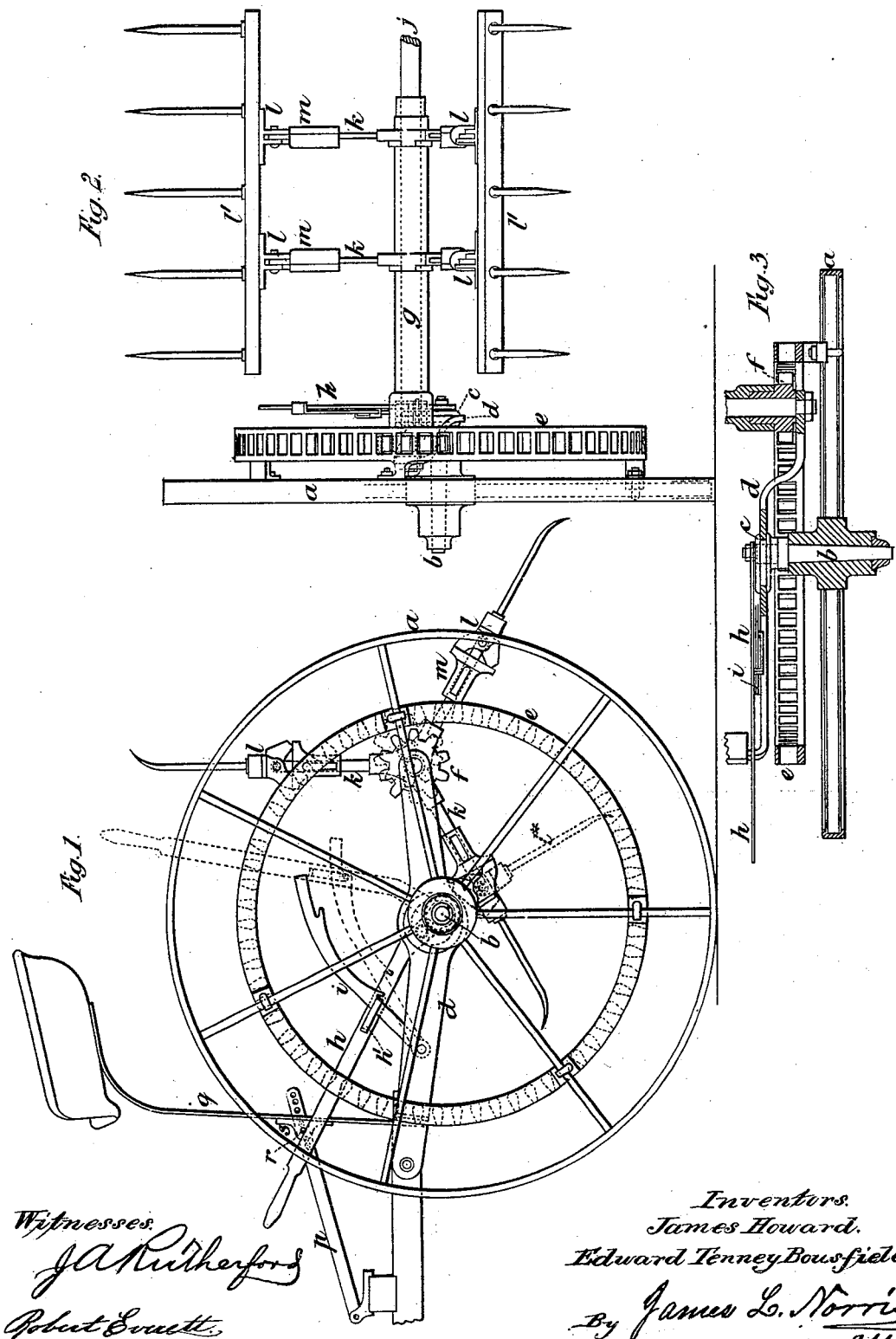

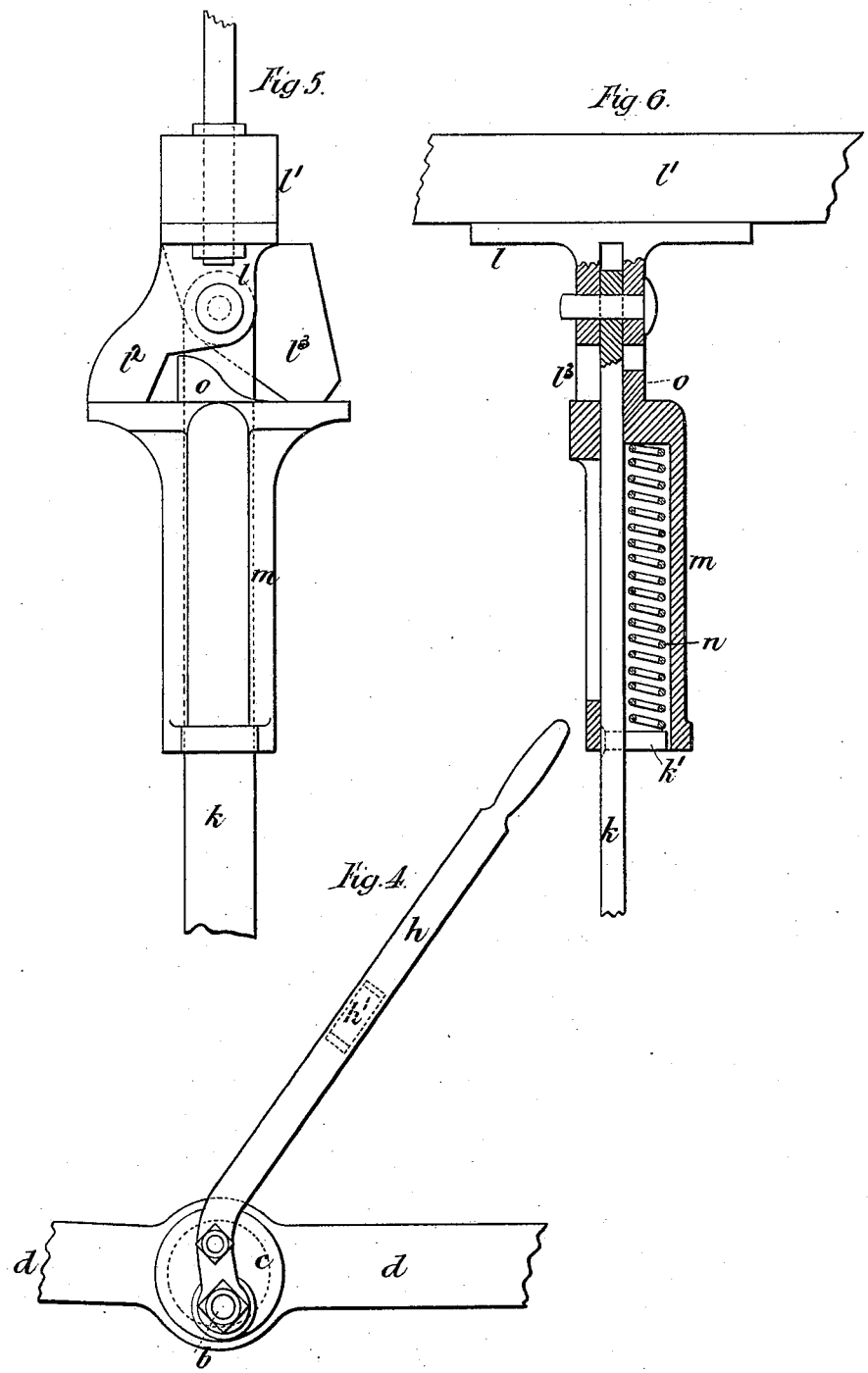

JAMES HOWARD AND EDWARD T. BOUSFIELD, OF BEDFORD, ENGLAND.

HAY-MAKING MACHINE.

SPECIFICATION forming part of Letters Patent No. 246,776, dated September 6, 1881.

Application filed April 14, 1881. (No model.) Patented in England July 3, 1880.

*To all whom it may concern:*

Be it known that we, JAMES HOWARD, agricultural engineer, and EDWARD TENNEY BOUSFIELD, engineer, both of Bedford, England, have jointly invented a new and useful Hay-Making Machine, (for which we have obtained a patent in Great Britain No. 2,726, bearing date 3d July, A. D. 1880,) of which the following is a specification, reference being had to the accompanying drawings.

The object of our invention is to improve the construction and thereby increase the efficiency of hay-making machines.

The said invention is illustrated in the accompanying drawings, in which Figure 1 is a side elevation of a portion of a hay-making machine, and Fig. 2 is a rear elevation of the same. Fig. 3 is a horizontal section of a portion of Fig. 1. Fig. 4 is a side view, drawn to an enlarged scale, of the aforesaid means for effecting the engagement and disengagement of the tine-barrels and traveling wheels. Fig. 5 is a side view, and Fig. 6 a front view, partly in section, also drawn to an enlarged scale, of a portion of a tine-barrel, hereinafter described.

Like letters indicate the same parts throughout the drawings.

The traveling wheels $a$ are mounted upon stud-axles $b$, fitted eccentrically to disks or plates $c$, axially connected to the side pieces, $d$, of the frame of the machine. The object of this arrangement will be more fully understood hereinafter in connection with the description of the levers for adjusting the tine-barrel pinions with relation to the traveling-wheel toothed ring. The said traveling wheels carry on their inner faces concentric toothed rings or wheels $e$, which are designed to gear into spur-pinions $f$, keyed on the hollow shafts $g$ of the tine-barrels. By bringing the said pinions into gear with the wheels $e$ the barrels will be caused to rotate in the same direction as the traveling wheels when the machine advances.

We prefer that the toothed wheels $e$, attached to the inner faces of the traveling wheels, should be of the kind shown—that is to say, should have their teeth formed as in a lantern or trundle wheel—these wheels being arranged to operate as internally-toothed wheels upon the pinions for transmitting rotary motion to the tine-barrels. These wheels are advantageous for the reason that they are not liable to clogging by the accumulation of particles of hay or dirt between the teeth; but it is obvious that we may use ordinary spur-wheels, if desired.

The pinions $f$ are securely fixed on the tine-barrel shafts $g$, which rotate upon a shaft, $j$, forming a tie-rod for the sides of the framing. When the tine-barrels are out of gear the pinions $f$ are in the position shown in full lines in Fig. 1, but when in gear they will occupy the position shown by dotted lines in the same figure.

To facilitate the engagement and disengagement of the said pinions and wheels we provide levers $h$, attached to the disks or blocks $c$ of the eccentric stud-axles $b$, by adjusting which in the full-lined position, referring to Fig. 1, they will act upon the disks so as to cause them to draw the side pieces, $d$, with the pinions $f$, forward or away from and out of engagement with the toothed ring $e$ and simultaneously elevate the points of the tines from contact with the ground. By adjusting the levers $h$ in the dotted-line position, same figure, it will be noticed that a reverse movement will be imparted to the side pieces, $d$, causing the pinions $f$ to again engage with the driving-wheel toothed ring $e$, and simultaneously depressing the tines, ready for operation. Each of these levers is held and locked in position, when adjusted, by a notched bar or catch-quadrant, $i$, hinged or pivoted to the side frame of the implement and projecting through a staple, $h'$, on the said lever. The said notched bar locks the lever in either of its two positions by the engagement of the staple with one or the other of the notches, and is disengaged from and disengages the lever by simply lifting it clear of the said staple. If desired, any suitable or equivalent locking devices may be substituted for those above described.

Our invention also comprises an improved construction of parts, whereby the tine-heads are held in position for work by devices which permit the tines or forks to be closed or folded up by hand, and also to yield or move automatically within a limited range when pressure of the crop or contact with the surface of the ground tends to close or turn them backward. These devices are most clearly shown in Figs. 5 and 6. $k$ is the radius-arm of the tine-barrel, to the outer end of which arm is hinged a T-bracket, $l$, to which the tine-head $l'$ is attached by bolts in the usual manner. This bracket is formed with two feet, $l^2\,l^3$, which rest upon the outer flat surface of a box or socket, $m$, which is suitably constructed to receive the radius-arm $k$, and is free to slide thereon. This box $m$ is held in contact with the hinged bracket $l$ by a spiral or coil spring, $n$, inclosed within the same. It will be seen that one end of this spring bears against the interior of the box $m$ and the other end against a stud, $k'$, or other abutment provided on the radius-arm $k$. The outer flat-end surface of the box $m$ is provided with a stop, $o$, in line with the foot $l^2$ of the bracket $l$—that is to say, this stop occupies such a position with regard to the foot $l^2$ as to limit the movement of the latter. The other foot, $l^3$, bears upon the surface of the spring-box in such a position as to be clear of or out of line with the said stop. The result of this combination of parts is that when the machine is in operation the tines are held in their working position with sufficient firmness to insure their efficient action; but when, by an obstruction presented to the tines during the rotation of the tine-barrels, the bracket $l$ is caused to tip or turn back on its pivot it will be brought up or arrested by the stop $o$, and when the obstruction is cleared the springs will return the tines to their proper working position.

It will be noticed that the feet by bearing or resting upon the end of the sleeve $m$, one upon each side of the hinged or pivotal point of the bracket, will retain the tine in its normal or working position as against any pressure not sufficient to overcome the action or tension of the springs, their tension being equal to the lifting capacity of the tines.

The distance of the tines from the ground may be regulated by means of the radial bar or arm $p$, jointed to the cross-bar of the shafts, and having its end arranged in a slot formed in the standard $g$, through which slot the said bar or arm freely passes. The bar or arm is provided with a series of holes for its connection with the said standard by means of a pin, $r$, which is passed through the jaws $s$ and one or other of the said holes, according to the desired position of the tine-barrels.

It will be observed that by the aforesaid adjustment of the bar $p$ the frame having the tines will be more or less elevated at its rear end, and thus effect the relative adjustment of the tines with the ground.

What we claim is—

1. In a hay-making machine, the combination, with the shaft-arm $k$, having the spring-sleeve $m\,n$, provided with a stop, $o$, of the pivoted or hinged tine-head bracket $l$, provided with the feet $l^2\,l^3$, one arranged in line with said stop and one adapted to bear upon the sleeve upon each side of the pivotal point of the tine-head bracket, substantially as and for the purpose set forth.

2. In a hay-making machine, the combination, with the tine-barrel shaft $g$, having the pinion $f$ gearing with or adapted to be disengaged from the driving-wheel toothed ring $e$, of the frame $d$, axially connected to the disks $c$, having eccentrically-arranged stud-axles $b$, the levers $h$, having loops $h'$, and double-notched quadrant $i$, substantially as and for the purpose described.

JAMES HOWARD.
EDWARD TENNEY BOUSFIELD.

Witnesses:
WM. ROBT. CAKE,
JOHN T. KNOWLES.